United States Patent
Hodebourg

(10) Patent No.: US 9,989,021 B2
(45) Date of Patent: Jun. 5, 2018

(54) ENGINE CONTROL VALVE IN A MOTOR VEHICLE

(71) Applicant: Valeo Systemes de Controle Moteur, Cergy Saint Christophe (FR)

(72) Inventor: Grégory Hodebourg, Sartrouville (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days. days.

(21) Appl. No.: 15/506,427

(22) PCT Filed: Aug. 24, 2015

(86) PCT No.: PCT/FR2015/052259
§ 371 (c)(1),
(2) Date: Feb. 24, 2017

(87) PCT Pub. No.: WO2016/030626
PCT Pub. Date: Mar. 3, 2016

(65) Prior Publication Data
US 2017/0268468 A1    Sep. 21, 2017

(30) Foreign Application Priority Data
Aug. 25, 2014  (FR) ..................................... 14 57970

(51) Int. Cl.
*F02M 26/70* (2016.01)
*F16K 1/228* (2006.01)
*F16K 1/226* (2006.01)

(52) U.S. Cl.
CPC ............. *F02M 26/70* (2016.02); *F16K 1/228* (2013.01); *F16K 1/2263* (2013.01)

(58) Field of Classification Search
CPC ........ F02M 26/70; F16K 1/228; F16K 1/2263
See application file for complete search history.

(56) References Cited

U.S. PATENT DOCUMENTS

2011/0100001 A1* 5/2011 Lilly ......................... F16K 1/22
                                                              60/605.2
2012/0181468 A1* 7/2012 Telep ................. F01M 13/0011
                                                              251/304

(Continued)

FOREIGN PATENT DOCUMENTS

FR    2 990 743 A1    11/2013
JP    H03-286152 A    12/1991

(Continued)

OTHER PUBLICATIONS

International Search Report issued PCT/FR2015/052259, dated Nov. 3, 2015 (2 pages).

(Continued)

*Primary Examiner* — Sizo Vilakazi
(74) *Attorney, Agent, or Firm* — Osha Liang LLP

(57) ABSTRACT

The invention relates to an engine control valve (100), comprising a flap (112) rotatably mounted in a valve body (126) around an axis (114) separating said flap into a first part (112A) and a second part (112B), said flap (112) being able to cooperate with sealing means carried by the valve body (126) in a closed position to stop the flow of a fluid through said flap for which the first part (112A) of the flap (112) sealingly cooperates with first sealing means (122A) and the second part (112B) of the flap (112) sealingly cooperates with second sealing means (124B). According to the invention, the first sealing means (122A) and the second sealing means (124B) are mounted securely so as to slide along the valve body (126).

6 Claims, 2 Drawing Sheets

(56) References Cited

U.S. PATENT DOCUMENTS

| | | | |
|---|---|---|---|
| 2013/0167815 A1* | 7/2013 | Bareis | F02M 25/0773 |
| | | | 123/568.24 |
| 2015/0128891 A1* | 5/2015 | Hodebourg | F16K 1/2057 |
| | | | 123/190.1 |
| 2016/0238140 A1* | 8/2016 | Lee | F16K 1/228 |
| 2017/0268467 A1* | 9/2017 | Hodebourg | F16K 1/2263 |

FOREIGN PATENT DOCUMENTS

| | | |
|---|---|---|
| JP | 2005-171808 A | 6/2005 |
| WO | 2013/190589 A1 | 12/2013 |

OTHER PUBLICATIONS

Written Opinion of the International Searching Authority issued in PCT/FR2015/052259, dated Nov. 3, 2015 (5 pages).

\* cited by examiner

ENGINE CONTROL VALVE IN A MOTOR VEHICLE

The invention relates to an engine control valve, as well as an engine and a motor vehicle comprising such a valve.

Traditionally, current engines comprise a pollution reduction system by recirculating exhaust gases that is made up of a pipe making it possible to cause the exhaust gases to pass toward the intake, accompanied by a heat exchanger intended to cooled the burned gases and a valve, commonly called exhaust gas recirculation (EGR) valve, the opening of which is controlled by an engine control computer in order to adjust the flow rate of burnt gases reintroduced toward the intake.

The operating principle of this type of valve is thus based on the controlled rotation of a flap, able to go from a completely open position to allow the exhaust gas fluid to pass, to a closed position to block this passage.

An engine control valve therefore has a flap, which is mounted pivoting on a rotation axis, such that said axis separates the flap into a first part and a second part. It should be specified that no physical boundary forms the border between the first and second parts of the flap, said parts being fictitiously separated by a plane passing through the rotation axis of the flap and intersecting said flap perpendicularly. When this flap is in the closed position, it comes into contact with sealing means, such as a seal, that are secured to the valve body, more particularly to the inner structure of the valve body. More specifically, the first part comes into contact with one face of the seal, while the second part of said flap bears on the opposite face of said seal.

Indeed, in reference to FIG. 1, an engine control valve 10 of the prior art comprises a flap 12 mounted rotating around a rotation axis 14, separating said flap 16 into first 12A and second 12B parts, said parts 12A, 12B being connected to one another vertically and in continuation of one another. In section, the flap 12 is globally in the shape of a thin rectangular parallelepiped, the longitudinal axis of which is perpendicular to the rotation axis 14 that traverses said flap 12.

The seal 16 of the inner structure of the valve 10, against which the flap 12 bears when the latter is in a closed position, is planar and comprises a first portion 16A able to cooperate sealingly with the first part 12A of the flap 12, and a second portion 16B intended to cooperate sealingly with the second part 12B of said flap 12. The two portions 16A, 16B of the seal 16 are planar and in continuation of one another. In reference to FIG. 1, when the flap 12 pivots to close, the first part 12A rises in the direction indicated by the arrow 18, to come into sealing contact with a first planar surface 20 of the first portion 16A of the seal 16, while the second part 12B of the flap 12 is folded down on the second planar surface 22, opposite the first surface 20, of the second portion 16B of the seal 16, in the direction indicated by the arrow 24.

In practice, the bearing of the first 12A and second 12B parts of the flap 12 on the opposite faces 20, 22 on the seal 16 means that it is necessary to offset the respective bearing faces of the first 12A and second 12B parts of the flap 12. However, the machining allowances of the flap 12 and the seal 16 show that in practice, the first part 12A of the flap 12, for example, is in contact with the first portion 16A of the seal 16 and play J remains between the second portion 16B of the seal 16 and the second part 12B. This play J is thus the source of an unwanted stray gas circulation that does not allow optimal operation of the pollution reduction system.

This play J is primarily the result of the machining allowances of the flap 12 and the seal 16 as well as the positioning allowances of these elements in the valve body 10. However, reducing the machining allowances to reduce the play J would involve a significant increase in manufacturing costs, which is not acceptable.

Furthermore, to guarantee the proper operation of the pollution reduction system, it is important to be able to control the flow of gases through the flap 12 perfectly, and to be able to guarantee complete closing of the valve when necessary.

The invention in particular aims to improve the sealing of the valve in the closed position.

To that end, it proposes an engine control valve for a vehicle, in particular a motor vehicle, comprising a flap rotatably mounted in a valve body around an axis separating said flap into a first part and a second part, said flap being able to cooperate with sealing means carried by the valve body in a closed position to stop the flow of a fluid through said flap for which the first part of the flap sealingly cooperates with first sealing means and the second part of the flap sealingly cooperates with second sealing means, characterized in that the first sealing means and the second sealing means are mounted securely so as to slide along the valve body.

Thus, when the valve moves from an open position to its closed position, the first part of the flap, for example, first comes into contact with the first sealing means. Due to the secure mounting so as to slide along the valve body, the first and second means move jointly in the direction of the force exerted by the first part of the flap on the first sealing means, which causes the second means and the second part of the flap to come closer together until they come into contact. The invention thus makes it possible to reduce the impact of machining allowances on the sealing of the valve in the closed position.

Advantageously, the first sealing means comprise a first annular seal and the second sealing means comprise a second annular seal, the first seal and the second seal being superimposed on one another, the first seal comprising a first portion protruding toward the inside of the valve relative to a first portion of the second seal and on which the first part of the flap is intended to press, the second seal comprising a second portion protruding toward the inside of the valve relative to a second position of the first seal and on which the second part of the flap is intended to press.

Preferably, the first sealing means comprise a planar sealing bearing surface of the first part of the flap and the second sealing means comprise a planar sealing bearing surface of the second part of the flap, the planar surfaces of the first and second sealing means being comprised in a same plane.

In one practical embodiment of the invention, the first means and the second sealing means are able to be slid over a predetermined distance smaller than 1 millimeter and preferably about 0.1 millimeters.

The invention also relates to a motor vehicle engine, comprising at least one valve of the type described above.

The invention also relates to a motor vehicle, comprising an engine incorporating a valve as described above.

The invention also relates to a motor vehicle, characterized in that it is equipped with a device of the aforementioned type.

The invention will be better understood and other details, features and advantages of the invention will appear upon reading the following non-limiting description done in reference to the appended drawings, in which.

Figure 1:
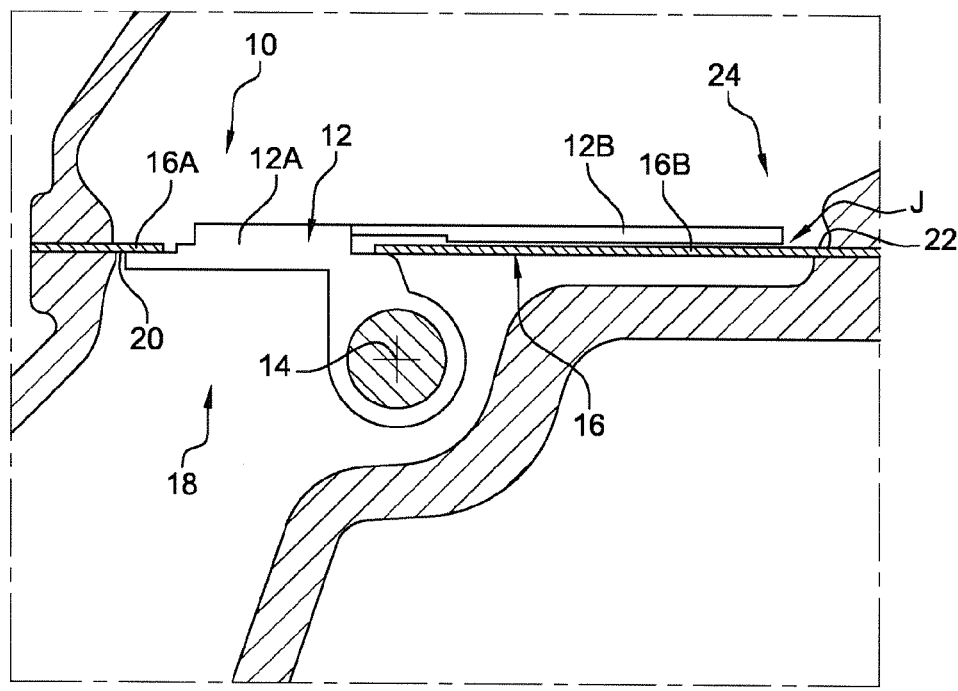
FIG. 1 is a sectional schematic view along a plane perpendicular to the axis of the flap of an engine control valve according to the known technique, this figure having been discussed above.
Figure 2:
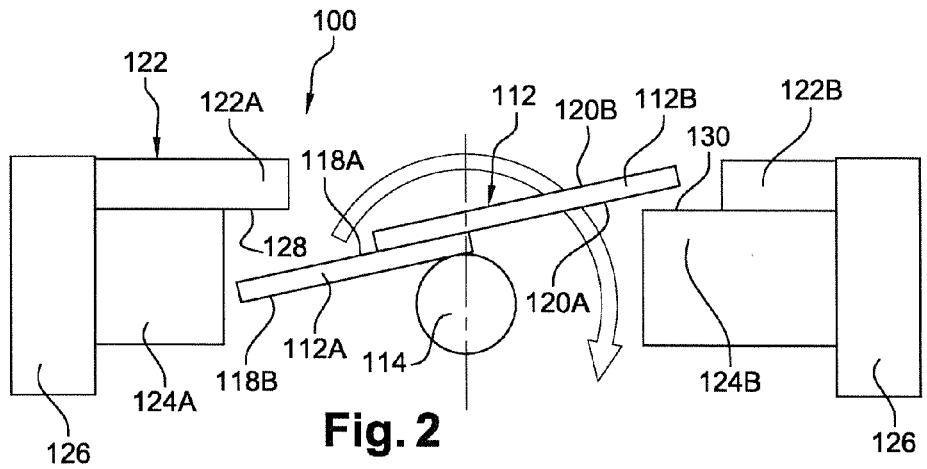
FIGS. 2 to 4 are schematic sectional views along a plane perpendicular to the axis of the flap of an engine control valve according to the invention in the successive positions from the valve in the open position (FIG. 2) to the closed position (FIG. 4).

Reference will now be made to FIG. 2, which shows an engine control valve 100 according to the invention comprising a flap 112 mounted pivoting around a rotation axis 114. The flap 112 comprises first 112A and second 112B parts connected to one another at the rotation axis 114. The first 112A and second 112B parts of the flap 112 are parallelepiped in section. The first part of the flap 112 comprises a first planar surface 118A and a second planar surface 118B that are opposite one another. Similarly, the second part 112B of the flap 112 comprises a first planar surface 120A and a second, opposite planar surface 120B. One end of the first part 112A of the flap 112 is arranged on the axis 114 such that its first surface 118A is opposite the axis 114 relative to its second surface 118B. The second part 112B of the flap 112 is applied at one end by its first planar surface 120A on the first planar surface 118A of the first part 112A of the flap 112.

The first part 112A and the second part 112B of the flap 112 have constant thicknesses in a direction parallel to the axis 114.

According to the invention, the first part 112A of the flap 112 cooperates with first sealing means and the second part 112B of the flap 112 cooperates with second sealing means, the first and second sealing means being mounted secured to one another and sliding along the valve body 126.

The first means are formed by a first annular seal 122 arranged on a second annular seal 124 that forms the second sealing means. The two annular seals 122, 124 are advantageously screwed on one another and are made from a rigid material such as aluminum or stainless steel.

The two annular seals 122, 124 are mounted sliding at their outer periphery on the inner structure of the valve body 126.

A first seal 122 comprises a first portion 122A protruding toward the inside of the valve 100 relative to a first portion 124A of the second seal 124 and is, in the closed position of the flap, arranged opposite the first part 112A of the flap 112. This protruding portion 124A of the first seal 124 comprises a planar surface 128 intended to come into contact in the closed position with the first planar surface 118A of the first part 112A of the flap 112.

The second seal 124 comprises a second portion 124B protruding toward the inside of the valve 100 relative to a second position 122B of the first seal 122 and is arranged, in the closed position of the flap, opposite the second part 112B of the flap 112. This protruding portion 124B of the second seal 124 comprises a planar surface 130 intended to come into contact in the closed position with the first planar surface 120A of the second part 112B of the flap 112.

Figure 4:
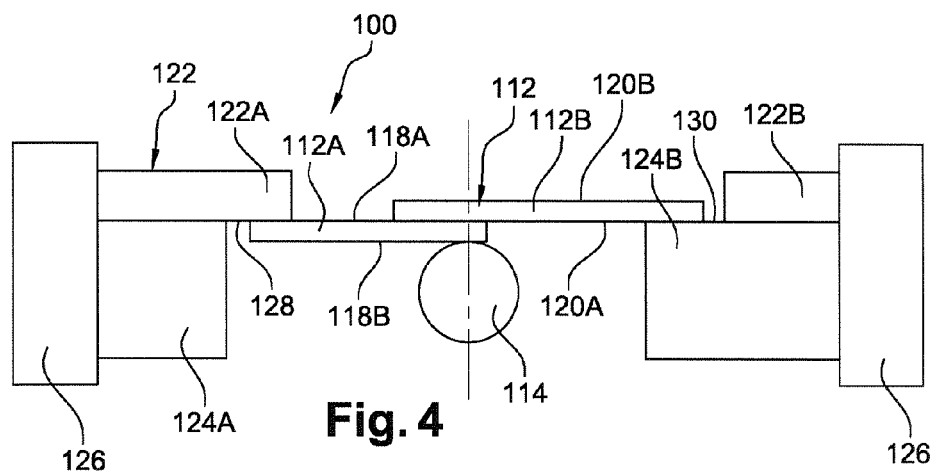

As shown in FIG. 4, the planar surface 128 of the protruding portion 112A of the first seal 122, the planar surface 130 of the protruding portion 124B of the second seal 124 and the first planar surfaces 118A, 120A of the first and second parts 112A, 112B of the flap 112 are situated in a same plane in the closed position.

Figure 3:
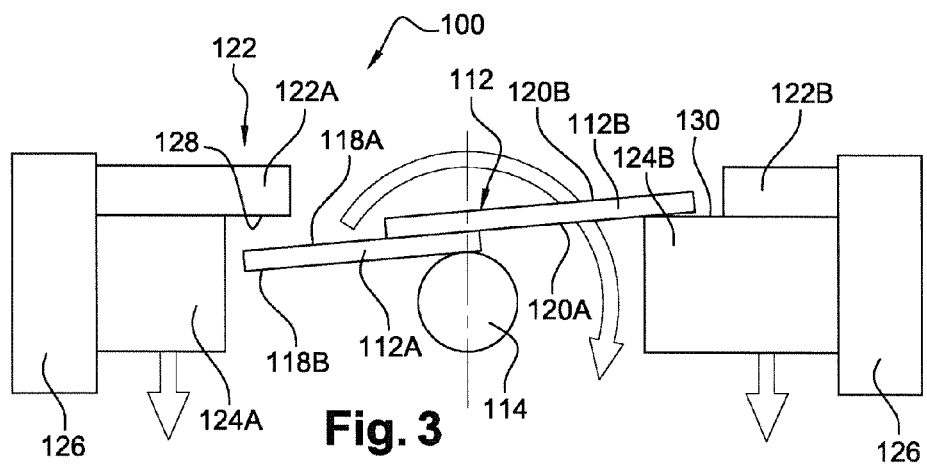

The sealed closing of the flap 112 is done as follows. An engine computer commands the rotation of the flap 112 in the direction indicated by the arrow (FIG. 2). In the configuration shown in FIG. 3, the second part 112B of the flap 112 comes into contact with the protruding portion 112B of the second seal 12, which causes a movement toward a downward sliding of the first 122 and second 14 seals. Following the rotation of the flap 112, the first part 112A of the flap 112 moves (rises) in the direction opposite the movement of the first 122 and second 14 seals, which causes the planar surface 128 of the first part of the flap 112 to come closer to, then into contact with the planar surface 128 of the protruding portion 122A of the first seal 122.

Thus, one can see that the assembly according to the invention makes it possible to ensure optimal contact of the first part 112A and the second part 112B with the first seal 122 and the second seal 124, respectively.

In one practical embodiment of the invention, the first and second seals 122, 124 can be moved by sliding over a predetermined distance smaller than 1 millimeter and preferably of about 0.1 millimeters. Each seal 122, 124 can have a thickness of about 3 to 4 mm, for example.

The term "annular" used in relation with the seals 122, 124 here means that the seal has a closed contour, seen along the axis of the seal. It will be understood that any type of closed contour can be used as long as the shape is suitable for cooperating with a flap 112 in a valve according to the invention.

The invention claimed is:

1. An engine control valve for a motor vehicle, comprising:
    a flap rotatably mounted in a valve body around an axis separating said flap into a first part and a second part,
    said flap being able to cooperate with sealing means carried by the valve body in a closed position to stop the flow of a fluid through said flap for which the first part of the flap sealingly cooperates with first sealing means and the second part of the flap sealingly cooperates with second sealing means,
    wherein the first sealing means and the second sealing means are mounted securely so as to slide along the valve body.

2. The valve according to claim 1, wherein the first sealing means comprise a first annular seal and the second sealing means comprise a second annular seal, the first seal and the second seal being superimposed on one another, the first seal comprising a first portion protruding toward the inside of the valve relative to a first portion of the second seal and on which the first part of the flap is intended to press, the second seal comprising a second portion protruding toward the inside of the valve relative to a second portion of the first seal and on which the second part of the flap is intended to press.

3. The valve according to claim 1, wherein the first sealing means comprise a planar sealing bearing surface of the first part of the flap and the second sealing means comprise a planar sealing bearing surface of the second part of the flap, the planar surfaces of the first and second sealing means being comprised in a same plane.

4. The valve according to claim 1, wherein the first means and the second sealing means are able to be slid over a predetermined distance smaller than 1 millimeter.

5. A motor vehicle engine, comprising at least one valve according to claim 1.

6. A motor vehicle, comprising an engine according to claim 5.

* * * * *